May 11, 1926.
R. E. ALEXANDER
1,584,268
SPEED REGULATOR
Filed Sept. 12, 1924
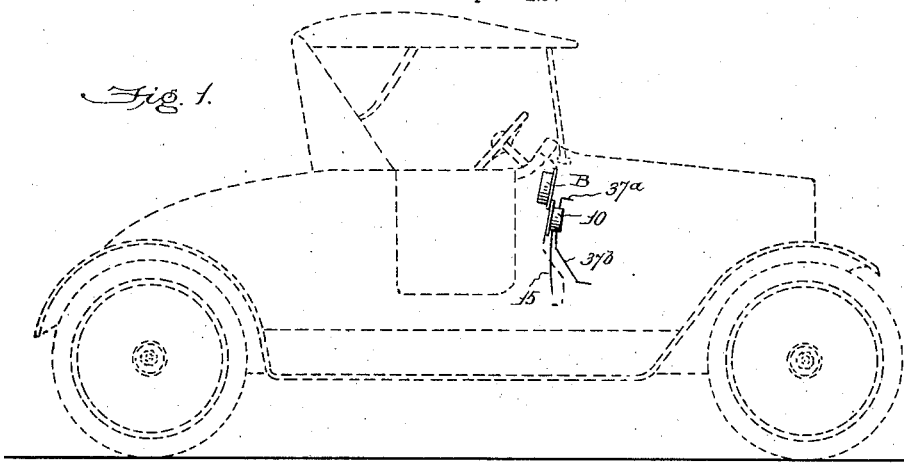
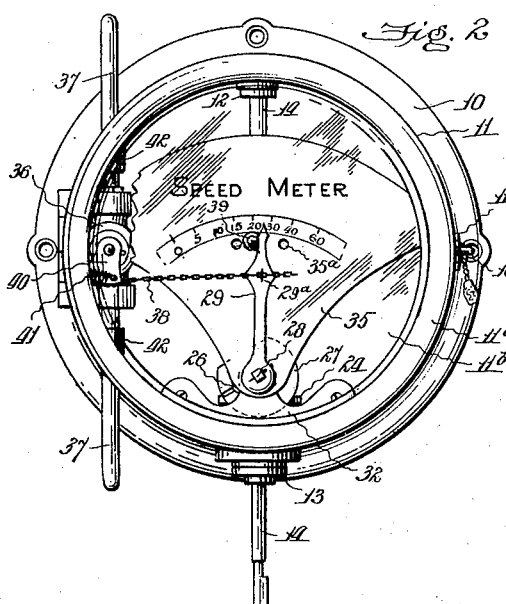
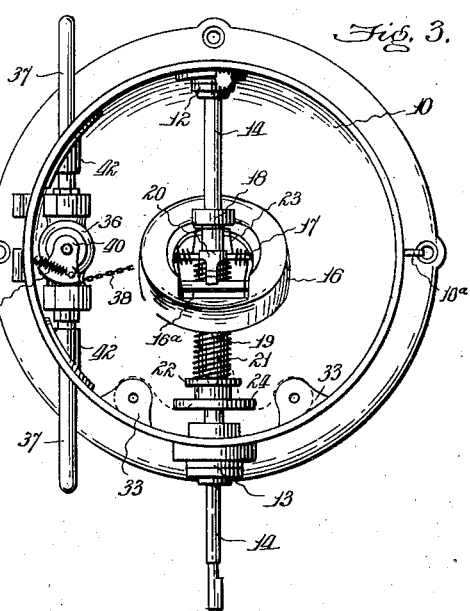
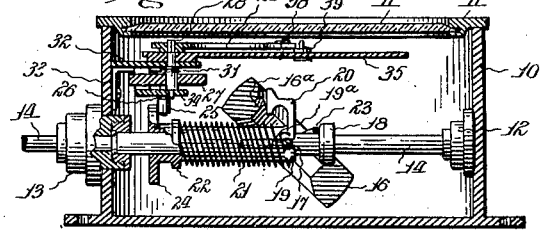
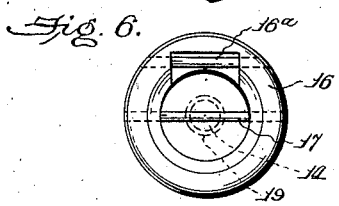
Inventor
R. E. Alexander.
By Horace S. Beall
Attorney.

Patented May 11, 1926.

1,584,268

UNITED STATES PATENT OFFICE.

RAYMOND E. ALEXANDER, OF PASSAIC, NEW JERSEY.

SPEED REGULATOR.

Application filed September 12, 1924. Serial No. 737,419.

My invention is an improvement in speed regulating devices for motor vehicles, and relates more especially to devices of this character which are employed for automatically controlling the operation of the motor particularly when a predetermined maximum speed of the vehicle is reached.

Owing to the large number of motor vehicles travelling the streets and highways and the fact that they are often-times driven recklessly at a high rate of speed has necessitated laws and regulations in different districts and municipalities governing their operation by setting a maximum speed at which they may be driven; but notwithstanding these precautionary measures there are many automobile drivers who persistently disregard them. Consequently it becomes necessary in certain instances to institute a safer check on the reckless driver by making it impossible for him to exceed the maximum speed prescribed. This may be accomplished in an effective manner by installation of a device which will automatically cut down or stop the operation of the motor when a predetermined speed has been reached.

The primary object of my invention therefore is to provide a speed regulating device or speed meter geared to a driven shaft of the motor and operating automatically to cut down or stop the motor when the speed of the vehicle reaches a predetermined maximum; in the present instance the regulating device or meter operating to control the supply of fuel or gasoline to said motor and the operating parts enclosed in a locked casing to provide a more effective check by precluding the possibility of the meter being tampered with in any manner to permit the maximum speed to be exceeded.

A further object of my invention is to provide a speed regulating device of this character in which the parts are compactly arranged in a small enclosing case preferably located under the hood of the motor vehicle and cooperating with the speedometer so that the driver may note the operation of the motor or speed of the vehicle and control the same accordingly.

A further object of my invention is to construct and arrange the operating parts of the speed meter so that they will be positive and dependable in action and unaffected by the vibration to which the device will be subjected in use for regulating the speed of a vehicle; all as hereinafter particularly described, and what I claim as my invention is specifically set forth in the appended claim.

In the accompanying drawings:

Fig. 1 is a side elevation illustrating the application of my improved speed regulating device to an automobile.

Fig. 2 is an enlarged detail plan view of the speed regulating device.

Fig. 3 is a similar view with certain parts removed to more clearly show the construction of governor mechanism.

Fig. 4 is a transverse sectional view through the speed regulating device, not including the fuel feed pipe and valve.

Fig. 5 is an inverted plan view of the parts operating the movable indicator-finger, and Fig. 6 is a detail face view of the governor-ring.

In carrying out my invention I provide a casing of conventional shape and construction, comprising a body portion 10 and hinged top 11, the bottom being extended laterally to form an attaching flange while the top consists of a metal rim 11$^a$ supporting a glass 11$^b$ in the usual manner so that certain parts enclosed within the casing may be viewed through the glass top. As shown in Fig. 2 the top is hinged at one side to the body portion of the casing and at the opposite side is provided with a hinged hasp 11$^c$ engaging a staple 10$^a$ projecting from the body portion so that said top may be locked or sealed when closed and thereby prevent the enclosed parts from being tampered with.

The casing is provided at opposite sides with bearings 12 and 13 to support a horizontal shaft 14, the bearing 12 receiving one end of said shaft while the bearing 13 is of the type shown in Fig. 4 so that the reduced outer end of the shaft extends through said bearing and beyond the casing to receive a flexible shaft, as 15 (Fig. 1), forming the required connection between a driven shaft of the motor and the speed regulating device, the outer end of shaft 14 being key-ended for connecting the flexible shaft thereto. The bearings 12 and 13 are of the conventional ball-bearing type.

The shaft 14 constitutes the main shaft of the speed regulating device and being driven by the flexible shaft 15 synchronously with the operation of the motor, after the manner of the corresponding shaft of a speedometer, carries and operates the governor device adapted to operate means hereinafter described for controlling the maximum speed at which said motor may be driven. I prefer to employ that well known type of governor device used in connection with speedometers comprising a gyratory weight ring 16 having a spindle 17 extending through the center of the same and through the shaft 14, by which the ring and shaft not only revolve together but the ring also may have an oscillating motion with respect to its axis and a centrifugal motion with respect to the shaft, the movement of the ring towards the shaft, or its normal position when said shaft is at rest, being limited by a collar 18 on the shaft, while its centrifugal movement—according to the speed of rotation of the driven shaft—being employed to actuate a sleeve 19 slidably mounted on the shaft and having an outwardly-projecting member 20 with which the aforesaid gyratory ring engages. As the governor-ring is preferably made of brass a steel-pin 16ᵃ is passed tangentially through the same to form a hard metal bearing for the engaging member 20. The slidable sleeve 19 also revolves with the shaft and ring, for which purpose it is provided with slots 19ᵃ through which the spindle passes, and movement of this sleeve in one direction —opposite to that imparted by the centrifugal movement of the governor ring—is effected by means of a coiled spring 21 interposed between the spindle 17 and a flange 22 near the outer end of said sleeve; and likewise movement of the governor ring, to its normal position, and more especially for counteracting to a more or less extent the centrifugal force imparted by rotation of the shaft, is provided for by a spring 23 coiled upon the spindle with its ends pressing against the pin 16ᵃ of said governor ring. As will be obvious the centrifugal movement of the weight ring with respect to the driven shaft 14 moves the sleeve upon the shaft against the action of the springs 19ᵃ and 23 proportionately to the increase of speed, and as this movement of the sleeve is utilized to operate other parts of the speed regulating device forming the essential features of my improvement it is provided with an annular flange or collar 24, which in the present instance engages a roller 25 at the lower end of a pin 26 depending from a rotatable disk 27 fast to an arbor 28 carrying at its upper end a lever 29, the latter serving also as a pointer or indicator-finger of the meter. The rotatable disk 27 is made fast to the arbor by a set-screw 30, and to return these parts—disk and indicator-finger—to normal position a coiled spring 31 is provided being wound around the arbor between the disk and supporting-plate 32 and connected at its ends to said parts respectively. The plate 32 is supported in the casing by brackets 33 and has a depending strap member 34 in which the lower end of the arbor is stepped, the rotatable disk being located between the body of the supporting plate and its strap-member. The lever or indicator-finger 29 is fast on the upper end of the arbor and below said lever, on a rounded portion of said arbor, there is a dial-plate 35 over which said indicator-finger moves, and in the present instance the indicator-finger serves as the means for operating a valve 36 in the gasoline feed pipe 37 to regulate or control the operation of the motor, though of course it may operate any other part of the motor or engine in controlling the speed of the same. The valve 36 is operated through the medium of the lever or indicator-finger and to limit the backward movement of the latter for the purpose hereinafter explained the dial-plate is provided with a pin 39 located in the path of said lever or finger, while the connection between the valve and finger is by chain 38, or other flexible connection, attached at one end to a hook 29ᵃ on the finger and at the other end to a segment 40 fixed to the upper end of the valve-plug. Adjustment to vary the operation with respect to the maximum speed permitted is obtained by lengthening or shortening the chain connection, and to correspondingly limit the backward movement of the indicator-finger the pin 39 may be located in any one of the series of holes 35ᵃ in the dial-plate. It will be understood that the pin 39 in acting as a stop to limit the backward movement of the indicator-finger prevents slack in the connecting chain when the speed is reduced below twenty-five miles an hour; thus said chain is kept taut at all times.

Where the feed-pipe extends through the sides of the casing for connection to the valve flanged collars 42 are provided and soldered on the inner side of said casing.

The speed regulating device or speed meter is preferably located under the hood of the motor vehicle, as illustrated in Fig. 1; one section, 37ᵃ, of the feed pipe extending to the fuel supply and the other, 37ᵇ to the carbureter (not shown); while the flexible shaft is connected to a driven part of the motor, as for instance the transmission gear.

In the operation of the speed regulating device or speed meter the governor device will begin to move the indicator finger only when the speed of the motor or vehicle reaches a predetermined point, for instance twenty-five miles per hour, and as the speed is increased said finger will operate the valve so as to cut down the fuel supply to the motor, the supply being entirely cut off when the speed of the vehicle is at forty miles an hour and above. As the speed meter is in view of the driver he can note the operation of the indicator-finger, and as the feed of the fuel to the motor is reduced very little when the speed of the vehicle is slightly above twenty-five miles an hour, the driver is thereby warned and may decrease the speed to prevent the fuel from being cut off entirely.

By enclosing all of the operating parts of the speed regulating device in a casing having a cover which of course may be locked or sealed it not only provides a very compact arrangement and comparatively small appliance that can be readily attached to the vehicle and connected up with the motor, but also prevents easy access to the parts to change the adjustment thereof.

It will be understood of course that instead of employing a gyratory weight ring governor as herein shown and described I may employ any other form of governor device, but the type employed in the present instance provides for a compact device simple and positive in action.

I claim:—

A speed regulating device for motor vehicles comprising a closed casing having a rotatable shaft passing therethrough and bearing therein, a dial-plate supported in the casing below the cover, a valve-operating finger movable over the dial-plate, and means for operating said finger from the rotatable shaft; together with a valve within the casing spring-actuated to normally open position and through which the fuel passes to the motor, a connection between the finger and valve to regulate the closing of the valve with respect to the movement of the finger over the dial-plate, and a stop-pin projecting from and adjustable on the dial-plate to limit the backward movement of the operating finger.

RAYMOND E. ALEXANDER.